United States Patent
Eckenroth et al.

(10) Patent No.: US 8,657,382 B2
(45) Date of Patent: Feb. 25, 2014

(54) STRUCTURAL PART, VEHICLE SEAT COMPRISING A BACK REST, AND METHOD FOR PRODUCING A STRUCTURAL PART OR A BACK REST

(75) Inventors: Dirk Eckenroth, Bergisch Gladbach (DE); Holger Roebkes, Solingen (DE)

(73) Assignee: Johnson Controls Technology Company, Holland, MI (US)

( * ) Notice: Subject to any disclaimer, the term of this patent is extended or adjusted under 35 U.S.C. 154(b) by 454 days.

(21) Appl. No.: 12/989,068

(22) PCT Filed: Apr. 17, 2009

(86) PCT No.: PCT/EP2009/002818
§ 371 (c)(1),
(2), (4) Date: Feb. 22, 2011

(87) PCT Pub. No.: WO2009/129965
PCT Pub. Date: Oct. 29, 2009

(65) Prior Publication Data
US 2011/0148172 A1    Jun. 23, 2011

(30) Foreign Application Priority Data
Apr. 22, 2008    (DE) .......................... 10 2008 020 289

(51) Int. Cl.
*A47C 7/02*    (2006.01)
*A47C 7/16*    (2006.01)

(52) U.S. Cl.
USPC ................. 297/452.18; 297/452.1; 297/452.2

(58) Field of Classification Search
USPC ............................... 297/452.1, 452.18, 452.2
See application file for complete search history.

(56) References Cited

U.S. PATENT DOCUMENTS

| | | | | |
|---|---|---|---|---|
| 4,275,925 A | * | 6/1981 | Harder, Jr. | ............. 297/452.2 X |
| 5,829,831 A | * | 11/1998 | Sharman | ................ 297/452.2 X |
| 6,347,836 B1 | * | 2/2002 | Hayotte | ..................... 297/452.2 |
| 6,742,847 B2 | * | 6/2004 | Yanai | .......................... 297/452.2 |
| 6,799,806 B2 | * | 10/2004 | Eppert et al. | ................ 297/463.1 |
| 6,820,896 B1 | * | 11/2004 | Norton | ........................... 280/735 |
| 6,981,748 B2 | * | 1/2006 | Garnweidner et al. | .. 297/452.18 |
| 7,753,443 B2 | * | 7/2010 | Uchida | ................... 297/452.2 X |
| 2006/0175887 A1 | * | 8/2006 | Behrens | .................... 297/452.18 |

(Continued)

FOREIGN PATENT DOCUMENTS

| | | |
|---|---|---|
| DE | 102 40 042 A1 | 3/2004 |
| DE | 102005043084 A1 | 3/2007 |

(Continued)

OTHER PUBLICATIONS

International Search Report for application No. PCT/EP2009/002818 mailed Jun. 23, 2009.

(Continued)

*Primary Examiner* — Rodney B White
(74) *Attorney, Agent, or Firm* — Fletcher Yoder P.C.

(57) ABSTRACT

A structural part, such as for a backrest of a vehicle seat has at least one panel element, a first profile element, and a second profile element. The panel and profile elements are connected to one another by at least one weld. The panel element has first beads in a first connecting region of the first profile element, and second beads in a second connecting region of the second profile element. A minimum spacing is provided between the first and second beads.

13 Claims, 2 Drawing Sheets

(56) References Cited

U.S. PATENT DOCUMENTS

Figure 1:
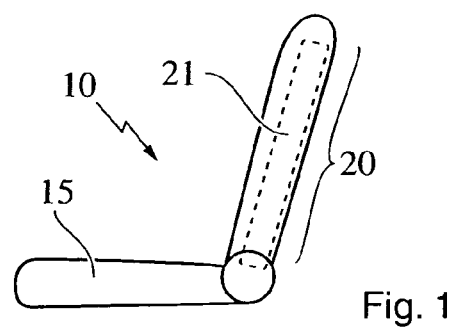

| | | | | |
|---|---|---|---|---|
| 2007/0278842 | A1* | 12/2007 | Ikai et al. | 297/452.2 X |
| 2008/0191539 | A1* | 8/2008 | Teufel et al. | 297/452.18 |
| 2010/0244538 | A1* | 9/2010 | Gross et al. | 297/452.18 |
| 2011/0148172 | A1* | 6/2011 | Eckenroth et al. | 297/452.1 |

FOREIGN PATENT DOCUMENTS

| | | |
|---|---|---|
| DE | 102006004466 A1 | 8/2007 |
| DE | 102006004467 A1 | 8/2007 |
| DE | 102006005751 A1 | 8/2007 |
| DE | 10 2006 036 935 A1 | 10/2007 |
| DE | 10 2006 036 915 a1 | 2/2008 |
| DE | 10 2007 042 169 A1 | 3/2009 |
| EP | 10688299 A1 | 8/2006 |
| JP | 2003237446 | 8/2003 |
| JP | 2006212441 | 8/2006 |
| JP | 2006224137 | 8/2006 |
| WO | 2005113189 A1 | 12/2005 |
| WO | 0189875 | 11/2011 |

OTHER PUBLICATIONS

Herausgegeben, et al.; Dubbel Taschenbauch Fur Den Maschinenbau 20. Auflage; ISBN 3-540-67777-1 20. Aufl. Springer-Heidelberg New York, 4 pgs.

Japanese Office Action mailed May 28, 2013.

* cited by examiner

STRUCTURAL PART, VEHICLE SEAT COMPRISING A BACK REST, AND METHOD FOR PRODUCING A STRUCTURAL PART OR A BACK REST

CROSS REFERENCE TO RELATED APPLICATIONS

This application claims priority from and the benefit of PCT Application No. PCT/EP2009/002818, filed on Apr. 17, 2009; German Patent No. DE 10 2008 020 289.4, filed on Apr. 22, 2008; all entitled "Structural Part, Vehicle Seat Comprising a Back Rest, and Method for Producing a Structural Part or a Back Rest", which are herein incorporated by reference.

BACKGROUND

The present invention relates to a structural part, to a vehicle seat having a backrest, and to a method for producing a structural part or a backrest.

Backrests for vehicle seats are generally known. For example, documents EP 1 688 299 B1, DE 10 2006 036 935 A1 and DE 10 2005 043 084 A1 disclose, respectively, a rear-seat backrest part of a vehicle seat, a backrest for a seat bench of a vehicle, and a construction set for producing a tiltable backrest for a seat bench of a vehicle. Here, continuous profile parts are connected to a panel part of the backrest such that comparatively large-area contact occurs between firstly a region of the panel part and secondly a region of the profile parts, specifically in particular in the region of so-called flanges or lugs which have the profile parts provided as hat-shaped profiles or the profile parts provided as U-shaped profiles equipped with lugs. The realization of such profile parts with flanges and the welding or connection of such flanges to a panel part however results firstly in an increase in the weight of the backrest without a corresponding increase in stability, and also in increased material expenditure and expenditure for producing such profile parts, because the lugs must be deformed.

Therefore, the present invention is based on the object of specifying a structural part, in particular for a backrest of a vehicle seat, and a vehicle seat having a backrest, in particular for a rear seat bench of a vehicle, such that the structural part and the backrest and the vehicle seat can firstly withstand high loading, but nevertheless have a comparatively low weight and can be produced easily and comparatively quickly, cheaply and variably with regard to the production of different variants of the structural part.

SUMMARY

The object is achieved by means of a structural part, in particular for the backrest of a vehicle seat, with the structural part having at least one panel element and also a first profile element and a second profile element, with the first profile element and the second profile element being provided connected to one another and also to the panel element by means of in each case at least one weld, wherein furthermore the panel element has first beads in a first connecting region to the first profile element and has second beads in a second connecting region to the second profile element, in such a way that a minimum spacing is provided between the first and second beads. In this way, it is possible according to the invention to construct a structural part according to the invention in a simple manner, and quickly and cheaply in terms of production. A particular advantage lies in the fact that the components (that is to say the panel element and the profile elements) can be realized with comparatively low tolerances with regard to their dimensional accuracy (at any rate with regard to those regions of the components which are to be connected to one another), such that high product quality and production with a low reject rate can be attained. According to the invention, it is possible in particular for the beads of the panel element to be produced with particularly high precision with regard to their positioning and their planeness (or evenness). The object is also achieved by means of a vehicle seat, in particular rear seat bench of a vehicle, having a backrest and if appropriate having a seat part, with the backrest and/or the seat part having at least one structural part, but preferably two structural parts, according to the invention, with it being particularly preferable according to the invention for the structural parts to be of different sizes. It is provided according to the invention in particular that the profile elements together form either a closed (in particular substantially tetragonal or rectangular) frame or else merely a U-shaped arrangement on the panel element. To realize a completely closed frame, it is provided according to the invention in particular that four profile elements (the first and second profile elements together with a third and a fourth profile element) are provided, with each profile element being connected firstly to the panel element and with each profile element secondly being connected to two of the other profile elements so as to form the frame with one another. According to the invention, it may likewise be provided that more than four profile elements are used to complete the frame; in particular, it may also be provided according to the invention that corner pieces or corner profile elements are provided in the corner regions of the frame. Below, however, reference will be made predominantly to the first profile element, which is connected to the second profile element in a connecting region (in particular a corner region of the frame), wherein the first and second profile elements are however any two of the profile elements which form the frame or which form the reinforcement structure connected to the panel element.

It is very particularly preferable according to the present invention for the first and/or second profile element to be connected at least partially by means of a butt weld to the panel element. This means in particular that for example a limb of one of the profile elements is connected with its edge (which runs along the profile part and which has substantially only the surface area of the material thickness multiplied by the length of the edges) to the surface of the panel element by means of a welding operation. It is also preferable according to the invention for said type of welding to be carried out by means of a laser (laser welding), with the laser beam being applied from that side of the panel element which faces away from the profile element (to be welded).

It is also preferable according to the invention for the first and/or second profile element to be provided as a U-shaped profile and/or a C-shaped profile and/or a Z-shaped profile, wherein in cross section, the limb end or limb ends of the first and/or second profile element are preferably provided without fastening lugs. The invention however does not completely rule out that the first and/or second profile element may (also) have lugs, in particular at those locations which are provided for connecting to auxiliary elements, for example for connecting belt retractors and/or for connecting pivot axles (provided for example for pivoting the backrest) and/or for connecting latching locks or latching bolts (provided for example for fixing the backrest relative to a vehicle body). According to the invention, it is particularly preferable for the first and/or second profile element to have a shape or a cross section which is such that, after the connection to the panel element, a hollow profile is formed which has a comparatively high degree of stability. According to the invention, U-shaped profiles or C-shaped profiles (which in cross section have an open side which is closed, so as form a hollow profile, as a result of the connection to the panel element), are particularly suitable for this purpose. According to the invention, it is however also possible for the first and/or the second profile element to be designed as an L-shaped profile or as a Z-shaped profile. It is possible even with a profile element of said type, in particular together with a deformed edge of the panel element, for a hollow profile to be generated (after assembly).

According to the invention, it is also preferable for the first and second profile elements to be connected to one another in an overlap region, with the overlap region preferably being provided only in that region of the profile elements which faces away from the panel element, and/or with the overlap region preferably at least partially extending over the minimum spacing between the first and second beads. In this way, it is particularly advantageously possible according to the invention for the connection of the profile elements to one another to be carried out after their connection to the panel element, such that in particular tolerances with regard to the dimensional accuracy of the components do not lead to the different welds adversely affecting one another. It is also preferably provided according to the invention that the overlap region is provided only in that region of the profile elements which faces away from the panel element, and/or that the overlap region preferably at least partially extends over the minimum spacing between the first and second beads. In this way, it can advantageously be achieved according to the invention that a deformation of the panel element in the region between the first and second beads for tolerance compensation is possible without problems and with a comparatively low expenditure of force. In this way, on account of the said tolerance compensation, comparatively low stresses are also introduced into the material of the components.

According to the invention, the welding both of the first profile element and of the second profile element to one another and also to the panel element is preferably provided by means of in each case one laser welding operation, which is possible at particularly low cost, particularly quickly and with particularly high accuracy.

A further subject matter of the present invention relates to a method for producing a structural part according to the invention or a method for producing a vehicle seat according to the invention, wherein in a first step, the first profile element and the second profile element are connected to the panel element by means of a first welding operation, wherein in a second step, tolerance compensation between the profile elements is carried out, and wherein in a third step, the profile elements are connected to one another in an overlap region by means of a second welding operation. In the method according to the invention, it is particularly preferable that, to position the profile elements relative to the panel element in the first step, merely an exertion of force between the profile elements and the panel element is provided, and that, to position the profile elements relative to one another in the third step, an exertion of force between the profile elements is provided. It is also preferable in the method according to the invention that, during the first welding operation, a first clamping of the profile elements and of the panel element relative to one another is provided, and that, during the second welding operation, a second clamping of the profile elements and of the panel element relative to one another is provided. Reclamping of the components is therefore carried out in the method according to the invention. In the case of a sequence of method steps in which the first step (first welding operation), then the second step (tolerance compensation, reclamping) and subsequently the third step (second welding operation) are carried out, the reclamping is carried out before the second welding operation (welding of the profile elements to one another) is carried out (and after the profile elements are connected to the panel element (by means of the first welding operation)). In the case of a sequence of the method steps in which the third step (second welding operation), then the second step (tolerance compensation, reclamping) and subsequently the first step (first welding operation) are carried out, the reclamping is carried out before the first welding operation (welding of the profile elements to the panel element) is carried out (and after the profile elements are connected to one another (by means of the first welding operation)).

DRAWINGS

Exemplary embodiments of the invention are illustrated in the drawing and will be explained in more detail in the following description.

FIG. 1 schematically shows a side view of a vehicle seat having a backrest.

Figure 2:
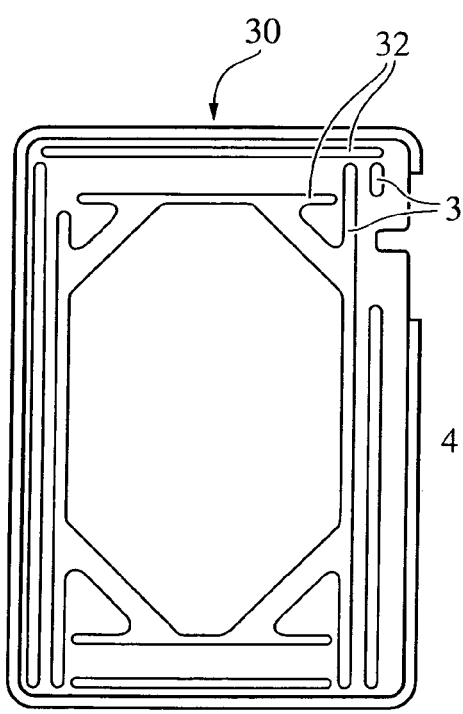

FIG. 2 schematically shows a plan view of a panel element without profile elements fastened thereto.

Figure 3:
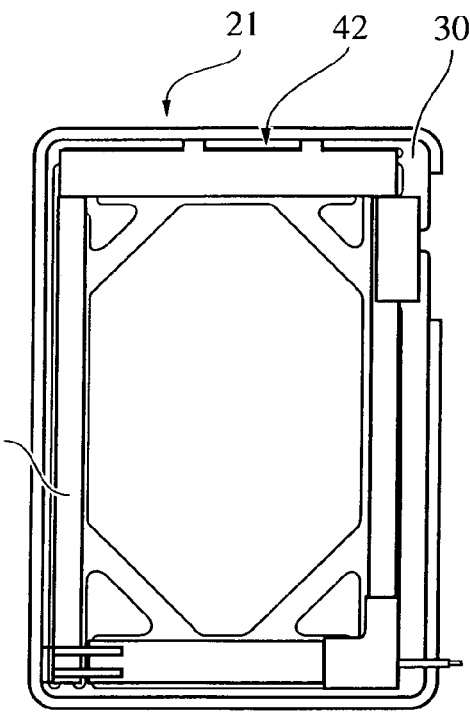

FIG. 3 schematically shows a structural part according to the invention, for example for use in the backrest of a vehicle seat.

Figure 4:
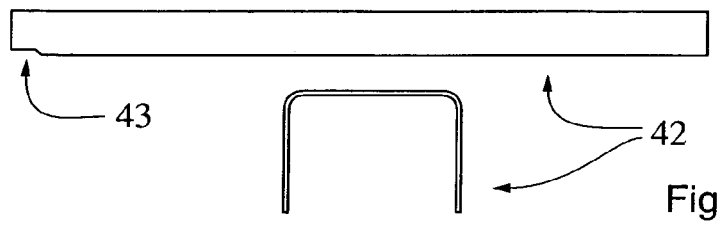
Figure 5:
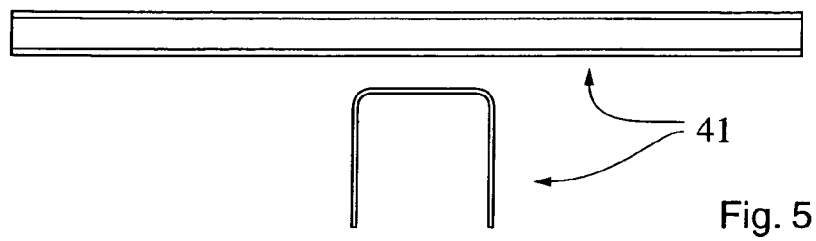

FIGS. 4 and 5 schematically show the first and second profile elements in plan view and in a sectional illustration.

Figure 6:
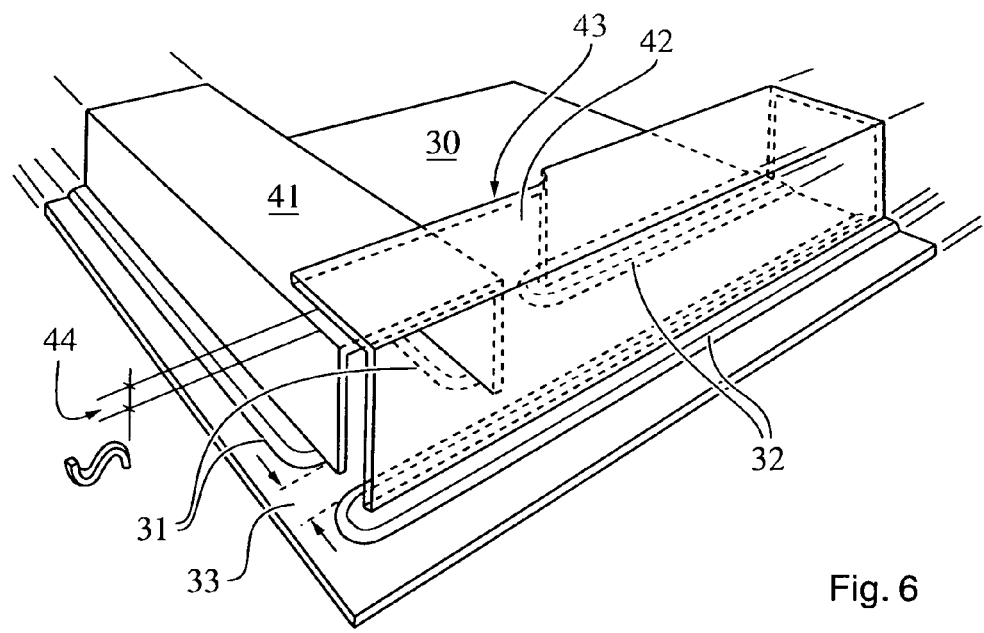
Figure 7:
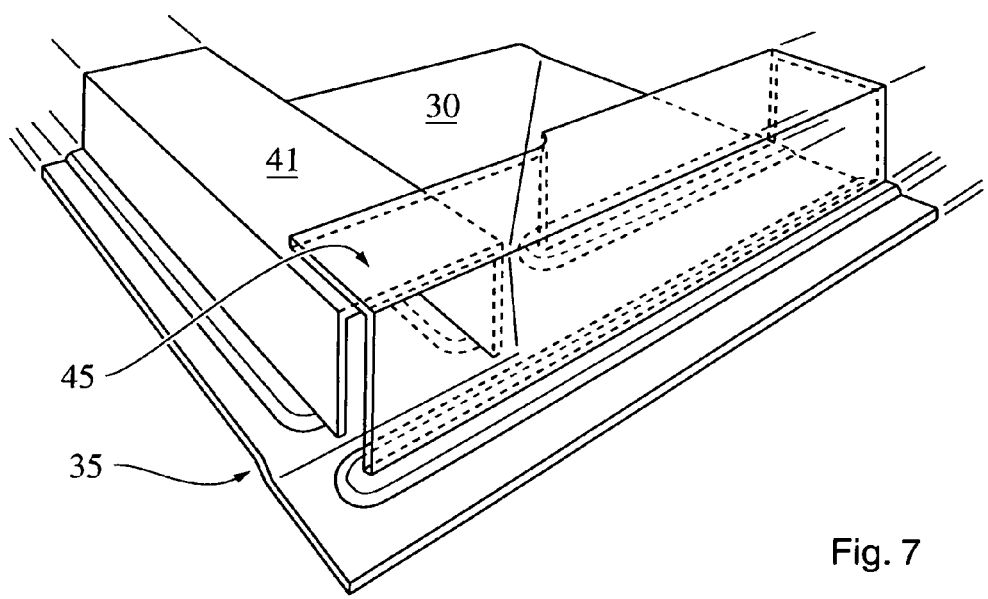

FIGS. 6 and 7 schematically show the production of the structural part according to the invention, with FIG. 6 showing the state after the first welding operation has taken place and FIG. 7 showing the state after reclamping of the components (before the second welding operation is carried out).

DETAILED DESCRIPTION

FIG. 1 schematically shows a side view of a vehicle seat 10 according to the invention having a backrest 20 and having a seat part 15. In the example illustrated, the backrest 20 has a structural part 21 according to the invention, which is indicated schematically by means of a dashed line. A similar structural part 21 could also be arranged in the seat part 15, but this is not illustrated. The structural part 21 has a panel element 30, which is illustrated in plan view in FIG. 2. The panel element 30 has first beads 31 and second beads 32, which according to the invention are spaced apart from one another such that a spacing is provided between each first bead 31 and each second bead 32, which spacing corresponds to a minimum spacing within the context of a multiple of the material thickness of the panel element 30, and lies in particular in the range from one to 30 times, preferably in the range from 2 to 15 times, and particularly preferably in the range from 4 to 10 times, the material thickness of the panel element 30. In all the variants or exemplary embodiments of the present invention, the height of the beads (for example with respect to a substantially non-deformed plane of the panel element) is provided such that the material of the panel element is at any rate plastically deformed, such that comparatively good dimensional accuracy of the component is ensured. For example, the height of a bead corresponds to 0.5 to 15 times the material thickness of the panel element, preferably one to 10 times the material thickness of the panel element, particularly preferably 2 to 5 times the material thickness of the panel element. The transition region of the transition from a bead to the non-deformed plane of the panel element corresponds for example to 0.5 to 15 times the material thickness of the panel element, preferably one to 10 times the material thickness of the panel element, particularly preferably 2 to 5 times the material thickness of the panel element. The width of a bead (excluding the transition region) corresponds for example to 3 to 50 times the material thickness of the panel element, preferably 5 to 30 times the material thickness of the panel element, particularly preferably 10 to 20 times the material thickness of the panel element.

FIG. 3 schematically shows the structural part 21 in a plan view. Here, the structural part 21 has a multiplicity of profile elements in addition to the panel element 30. In the illustrated example, the profile elements form a substantially fully encircling frame on a side of the structural part 21, which frame is of tetragonal design in the example. Of the profile elements, a first profile element 41 and a second profile element 42 are illustrated merely by way of example.

FIG. 4 schematically shows the first profile element 41 in a plan view (upper illustration) and in a sectional illustration (lower illustration). FIG. 5 schematically shows the second profile element 42 in a plan view (upper illustration) and in a sectional illustration (lower illustration). According to the invention, one of the profile elements 41, 42 (in the example, the first profile element 41) may have a cutout 43, such that, when the profile elements 41, 42 are positioned at an angle relative to one another, an overlap region 45 (cf. FIG. 7) can be formed.

The method according to the invention for producing the structural part 21 or for producing the vehicle seat 10 provides that, in a first step, a connection of the profile elements 41, 42 to the panel element 30 takes place. For this purpose, according to the invention, a first weld is provided (at least in parts). The first weld is provided in particular as a so-called butt weld. This means that an edge of the first and/or second profile element 41, 42 is welded to the panel element 30 in a butted manner (that is to say substantially without areal contact against the panel element 30). Before the first welding operation can be carried out, the components must be positioned relative to one another. This is carried out by pressing the first profile element 41 and the second profile element 42 against the panel element 30, such that edges of the profile elements 41, 42 to be butt-welded rest on the panel element 30 in bead regions or in regions of the first beads 31 and of the second beads 32. The first welding operation is carried out preferably from the rear side of the panel element 30, that is to say from the side of the panel element 30 facing away from the profile elements 41, 42. The third step of the production of the structural part 21, that is to say the welding of the profile elements 41, 42 to one another, requires said profile elements 41, 42 to be positioned relative to one another. On account of dimensional tolerances, a spacing of the profile elements 41, 42 can occur opposite the first weld in an overlap region 45. According to the invention, such a spacing is also desired and necessary if there is no other way for the first welding operation to be carried out in a reliable process (for example because the length of the limb of one profile element prevents the limb of the other of the profile elements from making contact in the butt-weld region). Said spacing is eliminated according to the invention by means of reclamping of the components in a second method step, in such a way that the profile elements 41, 42 are pressed against one another and a second welding operation can thereby be carried out in the overlap region in a reliable process. According to the invention, the chronological sequence of the method steps may firstly be as follows: first method step (first welding operation), then second method step (reclamping, tolerance compensation), then third method step (second welding operation). According to the invention, the chronological sequence of the method steps may however also alternatively be as follows: third method step (second welding operation), then second method step (reclamping, tolerance compensation), then first method step (first welding operation). FIGS. 6 and 7 schematically show the production of the structural part 21 according to the invention, with FIG. 6 showing the state after the first welding operation has taken place and FIG. 7 showing the state after a reclamping of the components (before the second welding operation is carried out). FIG. 6 illustrates the spacing 44 in the overlap region 45. As a result of the reclamping of the components before the second welding operation, said spacing 44 is transferred to the panel element 30, which is illustrated in FIG. 7 by means of the reference numeral 35. The minimum spacing 33 between the first beads 31 and the second beads 32 is schematically illustrated in FIG. 6.

The minimum spacing ensures that the panel element 30 runs in a substantially flat manner in the region between the beads 31, 32 (that is to say has no beads or other reinforcement elements) and is therefore soft or deformable enough to ensure that the transfer of the spacing 44 to the panel element 30 is possible without the exertion of excessively high forces and without the introduction of excessively high material stresses into the finished structural part 21.

LIST OF REFERENCE NUMERALS

10 Vehicle seat
15 Seat part
20 Backrest
21 Structural part
30 Panel element
31 First beads
32 Second beads
33 Minimum spacing
35 Deformation region
41 First profile element
42 Second profile element
43 Cutout
44 Spacing in the overlap region
45 Overlap region

The invention claimed is:

1. A structural part comprising at least one panel element, a first profile element, and a second profile element wherein the first profile element and the second profile element are connected to one another and also to the panel element by means of, in each case, at least one weld, and wherein the panel element has first beads in a first connecting region of the first profile element and has second beads in a second connecting region of the second profile element, and wherein a minimum spacing is provided between the first and second beads;
   wherein the first and second profile elements are connected to one another in an overlap region, the overlap region is only positioned on a portion of the profile elements that faces away from the panel element, and the overlap region at least partially extends over the minimum spacing between the first and second beads.

2. The structural part as claimed in claim 1, wherein the first and/or second profile element is connected at least partially by means of a butt weld to the panel element.

3. The structural part as claimed in claim 2, wherein the welding both of the first profile element and of the second profile element to one another and also to the panel element is provided by means of in each case one laser welding operation.

4. The structural part as claimed in claim 1, wherein the first and/or second profile element has a U-shaped profile and/or a C-shaped profile and/or a Z-shaped profile.

5. The structural part as claimed in claim 4, wherein the first and/or second profile elements have a limb end or limb ends without fastening lugs.

6. A vehicle seat comprising a backrest and/or a seat part, with the backrest and/or the seat part having at least one structural part in accordance with claim 1.

7. The vehicle seat as claimed in claim 6, wherein the vehicle seat comprises a rear seat bench.

8. The vehicle seat as claimed in claim 6, comprising two structural parts in accordance with claim 1.

9. The vehicle seat as claimed in claim 8, wherein the structural parts have different sizes.

10. A method for producing a structural part as claimed in claim 1, wherein in a first step, the first profile element and the second profile element are connected to the panel element by means of a first welding operation, and, in a second step, tolerance compensation between the profile elements is carried out, and, in a third step, the profile elements are connected to one another in an overlap region by means of a second welding operation.

11. The method as claimed in claim 10, wherein an exertion of force between the profile elements and the panel is sufficient to position the profile elements relative to the panel element in the first step, and wherein an exertion of force between the profile elements-is sufficient to position the profile elements relative to one another in the third step.

12. The method as claimed in claim 10, wherein during the first welding operation, the profile elements and the panel element are clamped relative to one another, and wherein, during the second welding operation, the profile elements and the panel element are clamped relative to one another.

13. The structural part as claimed in claim 1, wherein the structural part is an element of a backrest of a vehicle seat.

* * * * *